(12) United States Patent
Frazier et al.

(10) Patent No.: US 7,562,195 B2
(45) Date of Patent: Jul. 14, 2009

(54) BALANCED ALLOCATION OF MULTIPLE RESOURCES, OR OF MULTIPLE RESOURCES FROM MULTIPLE PROVIDERS

(75) Inventors: Peter Frazier, Princeton, NJ (US); Paul Andersen, San Diego, CA (US); Gary Boggs, San Diego, CA (US); Criselda Carrillo, San Diego, CA (US); Donn Holtzman, San Diego, CA (US); John Mark Morris, San Diego, CA (US); P. Keith Muller, San Diego, CA (US); Ronald Yellin, Poway, CA (US)

(73) Assignee: Teradata US, Inc., Miamisburg, OH (US)

( * ) Notice: Subject to any disclaimer, the term of this patent is extended or adjusted under 35 U.S.C. 154(b) by 408 days.

(21) Appl. No.: 11/564,339

(22) Filed: Nov. 29, 2006

(65) Prior Publication Data

US 2007/0168171 A1    Jul. 19, 2007

(51) Int. Cl.
*G06F 12/00*    (2006.01)
(52) U.S. Cl. .......................... 711/151; 711/4; 711/112; 700/28; 717/151; 718/104
(58) Field of Classification Search ................. 711/151, 711/4, 112; 700/28; 717/151; 718/104
See application file for complete search history.

(56) References Cited

U.S. PATENT DOCUMENTS

| | | | | |
|---|---|---|---|---|
| 5,325,525 A * | 6/1994 | Shan et al. | ................... | 718/104 |
| 5,408,663 A * | 4/1995 | Miller | ......................... | 718/104 |
| 5,926,649 A * | 7/1999 | Ma et al. | ........................ | 710/6 |
| 6,230,200 B1 * | 5/2001 | Forecast et al. | ............. | 709/226 |
| 6,405,282 B1 * | 6/2002 | Lam et al. | .................... | 711/112 |
| 6,442,650 B1 * | 8/2002 | Bachmat et al. | ............. | 711/114 |
| 6,584,545 B2 * | 6/2003 | Bachmat et al. | ............. | 711/114 |
| 6,594,698 B1 * | 7/2003 | Chow et al. | ................. | 709/226 |
| 6,711,649 B1 * | 3/2004 | Bachmat et al. | ............. | 711/114 |
| 6,954,931 B2 * | 10/2005 | Shetty et al. | ................ | 718/104 |
| 7,254,813 B2 * | 8/2007 | Leong et al. | ................ | 718/104 |
| 7,437,727 B2 * | 10/2008 | Leong et al. | ................ | 718/104 |
| 7,463,648 B1 * | 12/2008 | Eppstein et al. | ............. | 370/468 |
| 2004/0054850 A1 * | 3/2004 | Fisk | ........................... | 711/112 |
| 2005/0172291 A1 * | 8/2005 | Das et al. | .................... | 718/104 |
| 2007/0094665 A1 * | 4/2007 | Jackson | ...................... | 718/104 |

* cited by examiner

*Primary Examiner*—Stephen C Elmore
(74) *Attorney, Agent, or Firm*—AJ. Park (57) ABSTRACT

A system calculates the optimal allocation of two or more resources provided by a resource provider to a task within a computer system from a plurality of possible allocations. In doing so, the system calculates the total volume of an N-dimensional cube, where N is the number of resources provided by the resource provider, representing the respective amounts of resources available to be allocated. The system also calculates the average volume of the N-1 dimensional shapes forming the sides of the N-dimensional cube. The system then calculates, at least partly from the ratio of the total volume to the average volume, the balance resulting from the allocation of resources represented by the N-dimensional cube. The system then calculates the imbalance resulting from the allocation of resources at least partly from the balance and determines the smallest imbalance as the optimal allocation of resources.

16 Claims, 6 Drawing Sheets

BALANCED ALLOCATION OF MULTIPLE RESOURCES, OR OF MULTIPLE RESOURCES FROM MULTIPLE PROVIDERS

BACKGROUND

Computer systems generally include one or more processors interfaced to a temporary data-storage device such as a memory device and one or more persistent data-storage devices such as disk drives. Each disk drive generally has an associated disk controller. Data is transferred from the disk drives to the disk controller and is then transferred to the memory device over a communications bus or similar.

From time to time certain tasks are required to be performed by such computer systems. These tasks can be either user specified or system generated. Many such tasks can be accomplished by using one of several combinations of resources. Some sets of resources are provided by a single resource provider. In some computer systems there are multiple resource providers, each resource provider providing two or more resources.

One example of a resource provider is a persistent data-storage device such as a disk drive. The disk drive provides both physical storage space and disk head time. Both physical storage space and disk head time are examples of resources provided by the resource provider. When making an allocation from a disk, that disk provides not only the physical space but also the time needed by the application from the disk's head to access its data.

It is a difficult task to provide resources such as disk space and disk head time from multiple different resource providers in a way that ensures optimal allocation of the resources.

SUMMARY

Described below are methods for balanced allocation of multiple resources. Also described are methods for balanced allocation of multiple resources from multiple providers.

One technique described below involves calculating the optimal allocation from a plurality of possible allocations of disk head time and physical storage space provided by a resource provider to a task within a computer system. The area of a plane figure representing the respective amounts of disk head time and physical storage space available to be allocated is calculated, as well as the perimeter of the plane figure. The balance resulting from the allocation of resources represented by the plane figure is calculated at least partly from the ratio of the area of the plane figure to the perimeter of the plane figure. The largest balance is then determined as the optimal allocation of resources.

Another technique described below involves calculating the optimal allocation of two or more resources provided by a resource provider to a task within a computer system from a plurality of possible allocations. The total volume of an N-dimensional cube is calculated, where N is the number of resources provided by the resource provider. The N-dimensional cube represents the respective amounts of resources available to be allocated. The average volume of the N−1 dimensional shapes forming the sides of the N-dimensional cube is then calculated. The balance resulting from the allocation of resources represented by the N-dimensional cube is then calculated at least partly from the ratio of the total volume to the average volume.

The imbalance resulting from the allocation of resources is calculated at least partly from the balance, and the smallest imbalance is then determined as the optimal allocation of resources.

Another technique described below involves allocating two or more resources provided by a resource provider to a task within a computer system. This technique calculates the optimal allocation of the resources by the techniques described above and allocates the resources according to the calculated optimal allocation.

BRIEF DESCRIPTION

DETAILED DESCRIPTION

Figure 1:
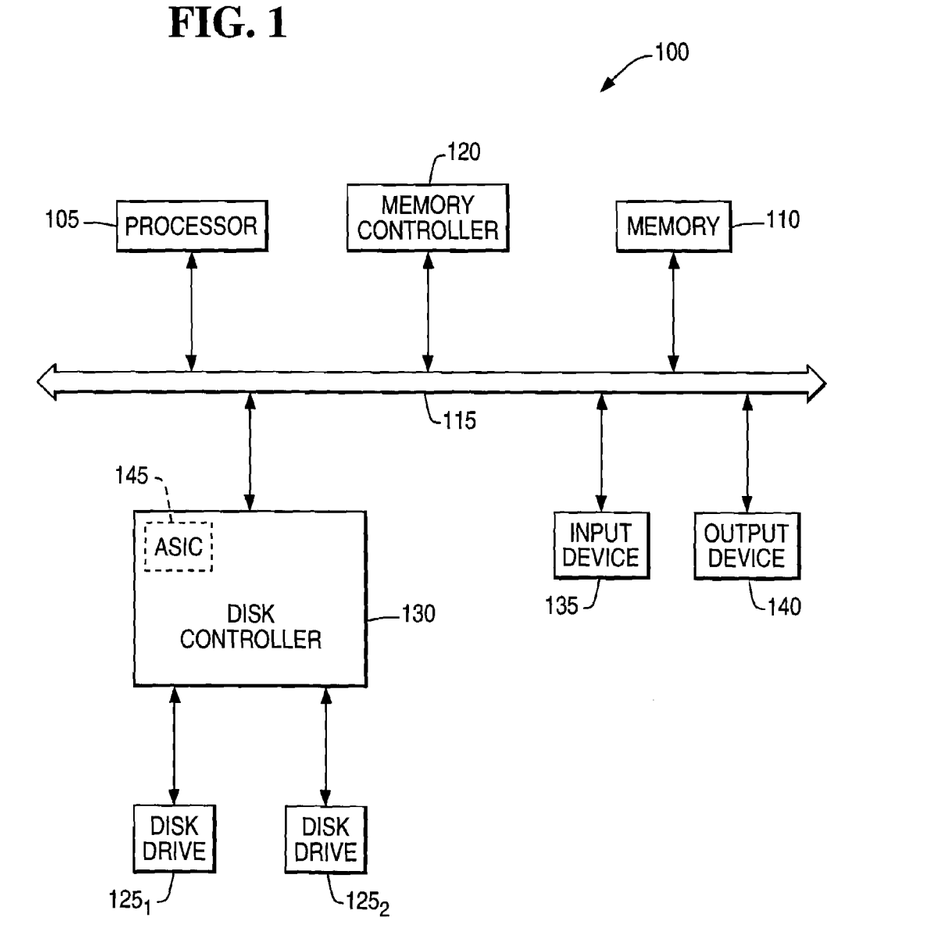
FIG. 1 is a block diagram of a computer system in which the techniques described below are implemented.

FIG. 1 shows a computer system 100 suitable for implementation of a method of optimal or balanced allocation of resources within a computer system. The system 100 includes one or more processors 105 that receive data and program instructions from a temporary data-storage device, such as a memory device 110, over a communications bus 115. A memory controller 120 governs the flow of data into and out of the memory device 110. The system 100 also includes one or more persistent data storage devices, such as disk drives $125_1$ and $125_2$ that store chunks of data or data objects in a manner prescribed by one or more disk controllers 130. One or more input devices 135, such as a mouse and a keyboard, and output devices 140 such as a monitor and a printer, allow the computer system to interact with a human user and with other computers.

The disk controller 130 receives requests from the memory controller 120 to store data objects on the disk drives 125 and to retrieve data objects from the disk drives. Each disk drive is viewed as a resource provider. One of the resources provided by each disk drive 125 is disk space. This disk space is room available for data-storage and is expressed as a fraction of the total space on a disk drive. For example if a disk has 100 GB of space, a potential allocation of one GB would reduce disk space by 0.01. Another resource provided by each disk drive 125 is disk time. Disk time is the time that the disk head on a disk drive spends servicing I/O requests.

The techniques described below calculate the optimal use of the disk drives by calculating the optimal allocation of resources provided by the disk drives to a task within the computer system 100. This task includes I/O operations. The technique is best implemented in an application-specific integrated circuit (ASIC) 145 that is configured to return an optimal allocation of resources. In one form, the ASIC 145 is associated with the disk controller 130. FIGS. 2 to 5 illustrate the technique of allocation of resources within a computer system such as computer system 100. By way of example the two resources demonstrated are physical storage space and disk head time. Both of these resources are provided by resource provider disk drive 125.

Figure 2:
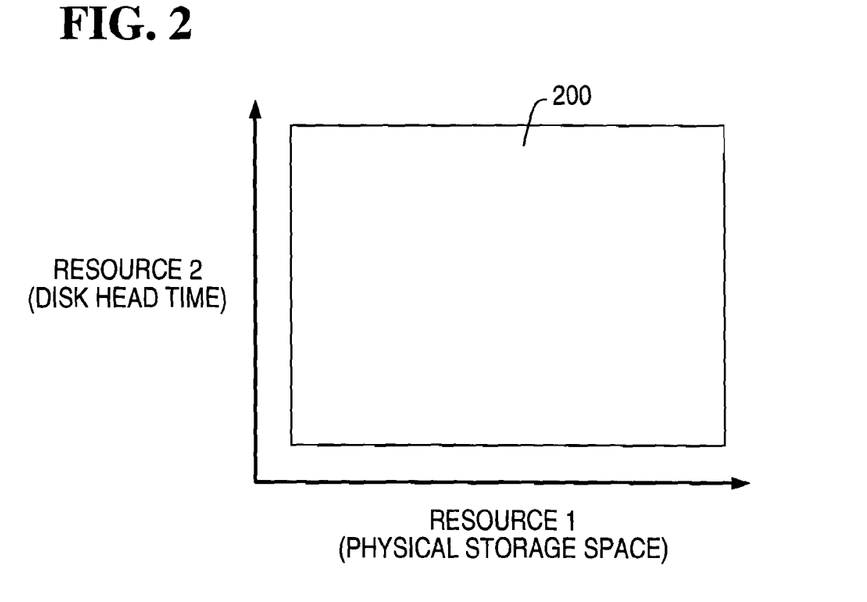
FIG. 2 shows a computer system such as computer system 100 prior to the allocation of any resources.

Referring to FIG. 2 box 200 illustrates the unallocated resources made available by disk drive 125. These resources are the physical storage space 205 and disk head time 210.

Figure 3:
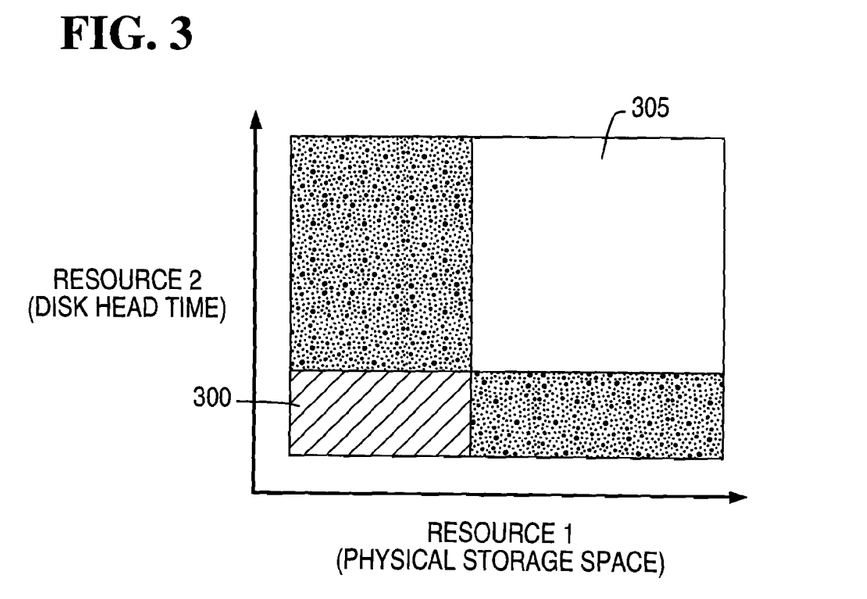
FIGS. 3, 4 and 5 illustrate the technique of successively allocating resources within the computer system.

Referring to FIG. 3, an allocation 300 is made to disk drive 125. The allocation 300 is represented in FIG. 3 by a plane figure such as a rectangle with width and height in proportion to the amount of each resource allocated. Allocation 300 for example uses more physical storage space than disk head time. The remaining unallocated resources are shown at 305. Areas 310 and 315 show resources that are no longer available from disk drive 125.

Figure 4:
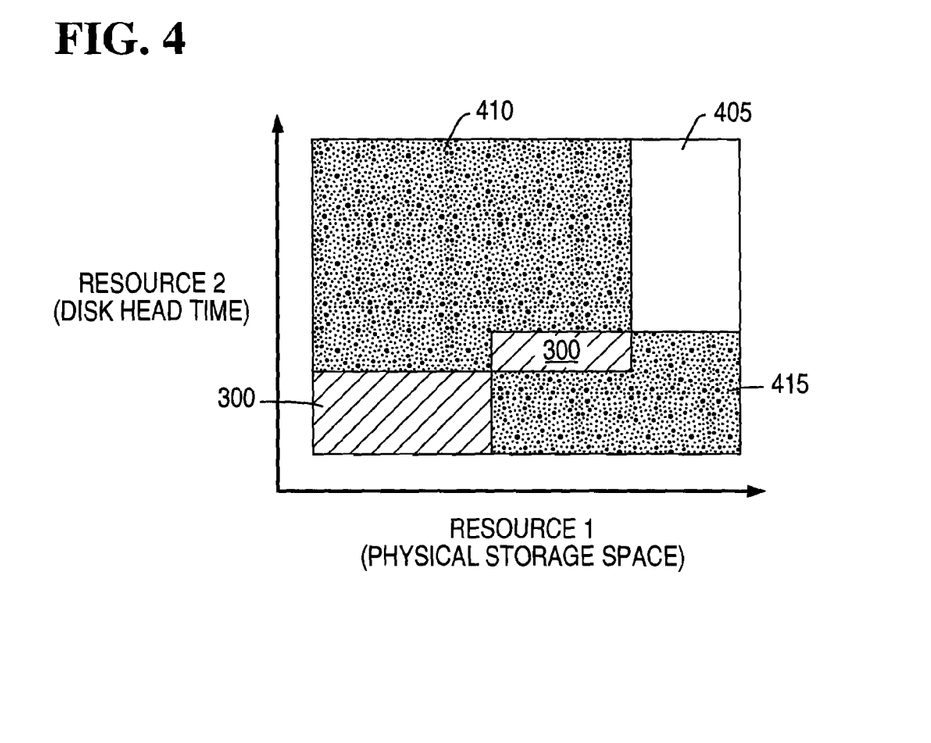

FIG. 4 shows new allocation 400 of resources following previous allocation 300. The remaining unallocated resource is shown at 405. Resources unavailable for further allocation include previous allocations 300 and 400 as well as the areas shown at 410 and 415 respectively.

Figure 5:
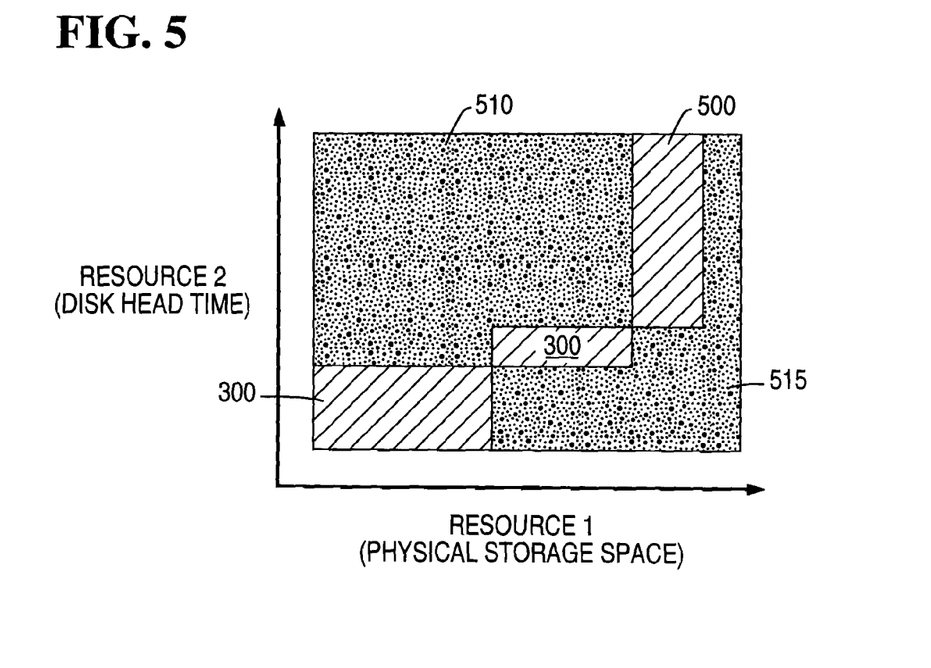

Referring to FIG. 5, new allocation 500 exhausts all the resources available provided by disk drive 125. In addition to previously allocated areas 300 and 400, unavailable areas are shown at 510 and 515. No further resources are available for allocation.

Each of allocations 300, 400 and 500 are the result of allocation choices. Resources remaining after a perfectly balanced set of allocations describe a perfect square. As the allocations stray from balance the rectangle described by the remaining resources will elongate. For each of these rectangles a single value known as the "balance" for two dimensions is described as:

$$\text{Balance} = \frac{16 \times \text{Area}}{\text{Perimeter}^2} \quad (1)$$

For optimal allocation of resources in a balanced fashion, the allocation choice made is one that gives the remaining resource plane figure or rectangle with the greatest balance. The factor of 16 normalizes the balance so that a perfect square has a balance of 1. All other rectangles have imbalances between 0 and 1. If one of the sides of the rectangle has zero length the balance is zero because the area is zero although the perimeter is still nonzero.

In two dimensions, balance is analogous to the slope of the diagonal of the remaining resource rectangle. As the balance grows closer to 1 the slope also approaches 1. As balance moves away from 1 and towards 0, slope moves away from 1 and either toward zero or toward infinity. An alternative calculation for balance that incorporates slope in two dimensions is as follows:

$$\text{Balance} = \frac{4 \times \text{Slope}}{(\text{Slope} + 1)^2} \quad (2)$$

In practice a resource provider will have two or more resources. Where more than two resources are involved it is necessary to use more than two dimensions. Assuming there are N resources, each resource is allocated its own axis and allocations from an individual resource results in movements along that axis. An allocation is described by the amount it takes from each resource and is shown by the following vector: $\vec{a} = (a_1, a_2, \ldots a_N)$.

The amount that this allocation takes from a single resource is calculated by the allocation's dot product with the unit vector along that resource's axis as follows:

$$\vec{a} \cdot \vec{u}_i = a_i \quad (3)$$

The resources taken by a set of allocations is the sum of the individual allocation vectors. This assumes that resource usages are linear namely that the resources used by for example allocations 1 and 2 are the same as the sum of the resources used by allocation 1 and the resources used by allocation 2.

Total resources available are described by an N dimensional vector:

$$\vec{1} = (1, 1, \ldots 1).$$

The resources available after an allocation $\vec{a}$ are described by the N-dimensional box with diagonally opposite corners at $\vec{1}$ and $\vec{a}$. It is the balance of this cube that is used to determine optimal allocation of resources.

One assumption of the technique is that in three dimensions balance is a ratio between volume and surface area and that in two dimensions balance is a ratio between area and perimeter. In multiple dimensions, it is the ratio between the N-dimensional volume of the whole shape, and the average volume of the N−1 dimensional shapes that make up the sides. If the N-volume is the top part of the ratio, then the quantity will be largest when the N-cube is balanced. It is necessary to render the balance dimensionless so that geometrically similar rectangles have the same balance. To do this it is necessary for the two different volumes to be exponentiated to have the same units. The N-dimensional cube is described by its lengths in the various dimensions of $x_1, x_2, \ldots x_N$. The N-dimensional volume of the cube is represented by:

$$\text{Volume}_N = \left( \prod_{i=1}^{N} x_i \right) \quad (4)$$

Each N−1 dimensional side of the cube is described by its N−1 lengths. For example, the squares that make up the side of a three dimensional cube each have two dimensions. Each pair of sides has all of the lengths that the full cube has except for one. There are N of these pairs of sides:

$$\text{Volume}_{N-1,j} = \frac{\text{Volume}_N}{x_j} \quad (5)$$

The technique calculates the average volume of the sides. This is the sum of the values calculated using equation (5) above divided by N:

$$\text{Volume}_{N-1} = \frac{1}{N} \sum_{j=1}^{N} \text{Volume}_{N-1,j} = \text{Volume}_N \left( \sum_{j=1}^{N} \frac{1}{Nx_j} \right) \quad (6)$$

The technique then raises the volumes to powers that give them the same units and then converts to a ratio:

$$\text{Balance} = \frac{(\text{Volume}_N)^{N-1}}{(\text{Volume}_{N-1})^N} \quad (7)$$

$$= \frac{(\text{Volume}_N)^{N-1}}{(\text{Volume}_N)^N} \left( \sum_{i=1}^{N} \frac{1}{Nx_i} \right)^{-N}$$

-continued $$= N^N \left(\prod_{j=1}^{N} x_j\right)^{-1} \left(\sum_{i=1}^{N} \frac{1}{x_i}\right)^{-N}$$

The technique uses the calculation of the balance to calculate imbalance. The underlying concept is to minimize imbalance rather than maximize balance as it is often easier to compute an imbalance rather than a balance. This is calculated as follows:

$$\text{Imbalance} = \text{Balance}^{-1} = N^{-N} \left(\prod_{j=1}^{N} x_j\right) \left(\sum_{i=1}^{N} \frac{1}{x_i}\right)^{N} \quad (8)$$

The balance of the remaining allocation cube described above has sides of length $1 - \vec{a}$, and it has an imbalance of:

$$\text{Imbalance} = N^{-N} \left(\prod_{j=1}^{N} 1 - a_j\right) \left(\sum_{i=1}^{N} \frac{1}{1-a_i}\right)^{N} \quad (9)$$

For each combination of resources that can satisfy a particular request or task the technique calculates what the imbalance of the resulting set of allocations would be. The technique then selects the allocation that minimizes the imbalance and returns that to the requester.

The following pseudo code describes one algorithm for allocating resources to a requester. This algorithm is a simplified one in which each resource is provided by a separate resource provider.

```
#define RESOURCES 100 /* How many resources we are handling */
/*
* Allocations is a 2-D array of the proposed allocations.
* Allocations[i][j] is dimension j from allocation i.
* j ranges from 0 to D-1, i ranges from 0 to NumAllocations-1
* findBestAllocations ( ) returns the index in Allocations [ ][ ]
* of the most balanced allocation
*/
int findBestAllocation(int NumAllocations, float **Allocations) {
    int i, ThisAllocation, BestAllocation, BestDimension,
        ThisDimension;
    float BestImbalance, *A, ThisProduct, ThisSum, ThisImbalance;
    BestAllocation = -1;
    for (ThisAllocation=0; ThisAllocation< NumAllocations;
        ThisAllocation++)
    {
        A = Allocations[ThisAllocation]; // allocation under
        consideration
        ThisDimension = RESOURCES;
        ThisProduct = 1;
        ThisSum = 0;
        for (i=0; i<RESOURCES; i++) {
            if (A[i] != 0) {
                ThisProduct *= A[i];
                ThisSum += 1/A[i];
            } else {
                ThisDimension--;
            }
        }
        /* power (a,b) raises a to the b power */
        ThisImbalance = ThisProduct * power(ThisSum,
        ThisDimension);
        if (BestAllocation == -1 ||
            ThisDimension > BestDimension ||
```

```
            ThisImbalance < BestImbalance) {
                BestAllocation = ThisAllocation;
                BestDimension = ThisDimension;
                BestImbalance = ThisImbalance;
            }
    }
    return BestAllocation;
}
```

As described above, in some situations some sets of resources will be provided by a single provider. If one resource from a provider is no longer available, the other resources provided by that resource provider cannot be used. In the example above where the resource provider is a hard disk, the hard disk provides both physical storage space and disk head time as resources. If all of the physical storage of a disk is used, none of the disk head time of that disk can be allocated.

To allow for multiple resource providers the technique includes a check on each allocation. If a resource provider has one resource no longer available, all of the resources of that resource provider are considered used up and the balance and imbalance is calculated as if those values were zero. The following pseudo code describes the algorithm extended to cope with multiple resources provided by multiple resource providers.

```
/*
* RESOURCE_PER_PROVIDERS PROVIDERS is how many
resources there are in total.
* This particular pseudocode requires a fixed number of resources
per
* provider, but this was enforced just to make the code simpler.
The
* algorithm does not require this.
*/
#define NRESOURCES_PER_PROVIDER 2
#define NPROVIDERS 50
/*
* Allocations is a 3D array of the proposed allocations.
* Allocations[i][j][k] is allocation i, provider j, and resource k.
* i ranges from 0 to NumAllocations-1
* j ranges from 0 to NPROVIDERS-1
* k ranges from 0 to NRESOURCES_PER_PROVIDER-1
* findBestAllocations ( ) returns the index in Allocations [ ][ ][ ]
of the most
* balanced allocation
*/
int findBestAllocation(int NumAllocations, float ***Allocations) {
    int providerMaxed;
    int j, k, ThisAllocation, BestAllocation, BestDimension,
        ThisDimension;
    float BestImbalance, **A, ThisProduct, ThisSum, ThisImbalance;
    BestAllocation = -1;
    for (ThisAllocation=0;ThisAllocation<
        NumAllocations;ThisAllocation++){
        A = Allocations[ThisAllocation];//allocation under
        consideration
        for (j=0; j<NPROVIDERS; j++) {
            /* Any provider with one resource maxed out is
            treated
             * as if all its resources were maxed out. */
            providerMaxed = 0,
            for (k=0; k<NRESOURCES_PER_PROVIDER; k++) {
                if (A[j][k] == 0) { /* Provider j is maxed */
                    providerMaxed = 1;
                    break;
                }
            }
            if (providerMaxed)
                ThisDimension -=
```

-continued

```
            NRESOURCES_PER_PROVIDER;
        else
            for (k=0; k<NRESOURCES_PER_PROVIDER;
            k++) {
                ThisProduct *= A[j][k];
                ThisSum += 1/A[j][k];
            }
    }
    /* power(a,b) raises a to the b power */
    ThisImbalance = ThisProduct * power ThisSum,
    ThisDimension);
    if (BestAllocation == -1 ||
            ThisDimension > BestDimension ||
            ThisImbalance < BestImbalance) {
        BestAllocation = ThisAllocation;
        BestDimension = ThisDimension;
        BestImbalance = ThisImbalance;
    }
    }
    return BestAllocation;
}
```

In the above examples the number of resources provided by the resource provider is fixed and is the same for each resource provider. This is a simplification of the algorithm as it is assumed that the number of resources provided by each resource provider can be different.

The above techniques have the potential to provide optimal allocations in circumstances where the allocation choices are "fair". In this context, the term "fair" means that all possible allocations that accomplish a task are linear transformations of each other, and that these linear transformations are constant in time. This means that there exists a matrix T for two possible allocations A and B such that B=TA. The matrix does not change across sets of allocation choices.

Although the technique is applicable to several different situations, it is particularly suited to disk pool allocation. Each disk in the pool is a resource provider that provides two resources, disk space and disk head time. Disk space is room available for data-storage and is expressed as a fraction of the total space on a disk drive. If a disk has 100 GB of space, a box representing a 1 GB allocation would have a length of 0.01. Disk head time is the time that the disk head spends serving I/O requests and is expressed as a fraction of the maximum allowable busy time. If the maximum allowable busy time is 80% a box representing a 10% allocation of the disk's time would have a length of 0.125 along the dimension representing time on that disk. This is calculated by the ratio 10/80.

A single request for resources usually asks for disk space and time on one or more disks. Usually resources on only one disk are requested, but in the case where mirrored pairs of disks for data redundancy are required by the requester, space and time on two disks are requested. Additional requirements on which pairs of disks can mirror each other, such as their being in different at-risk groups, can be added without modifying the techniques described above. Considering mirrored pairs as a single allocation squares the number of possible allocations, which causes an increase in runtime complexity of the above techniques. If this is undesirable then mirrored pairs can be considered as two separate allocations with only a small loss in efficiency.

It is desirable to specify the allowable busy time as less than 100% in order to avoid the situation where latency increases noticeably. As the disk is used closer to 100% of the time, I/O latency increases as an issued I/O must wait longer for the disk to process I/Os in front of it on the queue. Keeping disk time usage below 80% has the added benefit of making the addition of times of allocations linear. If two allocations each use 10% of the disk time, together they will use about 20%, but if two allocations each use 75% of the disk, together they will use 99.99% of the time not 150%. The technique is still applicable in the non-linear range of disk time as long as the additional usage of a resource by a new allocation can be computed before the allocation is made.

Disk time used by an allocation can be estimated beforehand by making the allocation on an otherwise unused disk and generating a load to that allocation similar to the one that will be seen in production. It can also be estimated by considering characteristics of the disk and the I/Os accessing the allocation. Access times are calculated as if the disk head is seeking to the allocation from a random place on the disk. It is assumed that before an allocation's I/O starts, there is a minimal chance of the disk's cache containing the queried data. This could be changed in the special case where a single allocation consumes most of the disk's time. For a single I/O repeating at a certain frequency disk time is calculated as follows:

$$DiskTime = \frac{I/O \text{ Frequency} \left( \text{Disk Seek Time} + \frac{I/O \text{ Size}}{\text{Disk Transfer Rate}} \right)}{\text{Disk Maximum Busy Time}} \quad (10)$$

If I/Os with different sizes or frequencies will access the allocation, the time used by each of the I/Os can be summed together to find the total time as follows:

$$DiskTime = \sum_{k=1}^{\#I/Os} \frac{I/O_k \text{ Frequency} \left( \text{Disk Seek Time} + \frac{I/O \text{ Size}}{\text{Disk Transfer Rate}} \right)}{\text{Disk Maximum Busy Time}} \quad (11)$$

After an allocation is made, real time statistics on an allocation's disk utilization can be collected and used to adjust the estimates made at allocation time. This will reduce the harm caused by estimation errors.

The techniques described above are also applicable for use in the determining optimal allocation of resources on a multi-zoned disk. As described above, each disk is considered to be a resource provider with the two resources provided of disk storage capacity and percentage of disk time used. An application layer allocates cylinders from a disk in response to requests from a higher application layer. As cylinders are allocated, cylinders on that disk become less performant due to disk contention. The technique attempts to allocate cylinders so that a minimum quality of service is maintained and a minimum amount of storage space is left available.

The disk storage capacity resource is self explanatory. If an allocation needs 73 GB, the disk storage capacity used is 73 GB.

The percentage of disk time used by an allocation's I/O can be calculated by considering separately each class of I/O. A class of I/O is a subset of all of the I/O, with a single value for zone, frequency (defined as the number of I/Os per second), data block size, and data on whether the I/O is read or write. Estimated access and transfer times are summed together for each I/O class, and then multiplied by I/O class frequency to obtain the disk time used. The disk times for all I/O classes sum together to give total disk time used by the allocation.

Access times are calculated as if the disk head is seeking to the allocation from a random place on the disk. It is assumed that before an allocation's I/O starts, there is a minimal chance of the disk's cache containing the queried data. This could be changed in the special case where a single allocation consumes most of the disk's time. Transfer times are calculated with a transfer rate within the allocation's zone.

The allocator keeps track in a separate table the size of each zone, and how much space remains in each zone. If a single allocation is too large to fit in an individual zone, the allocation can be split into multiple allocations, one for each of the zones from which resources are allocated.

FIGS. 6 to 9 illustrate the technique of allocation of resources within a computer system that includes multiple zones on one or more of the disks. The two resources demonstrated are physical storage space and disk head time. Both resources are provided by a resource provider disk drive.

Figure 6:
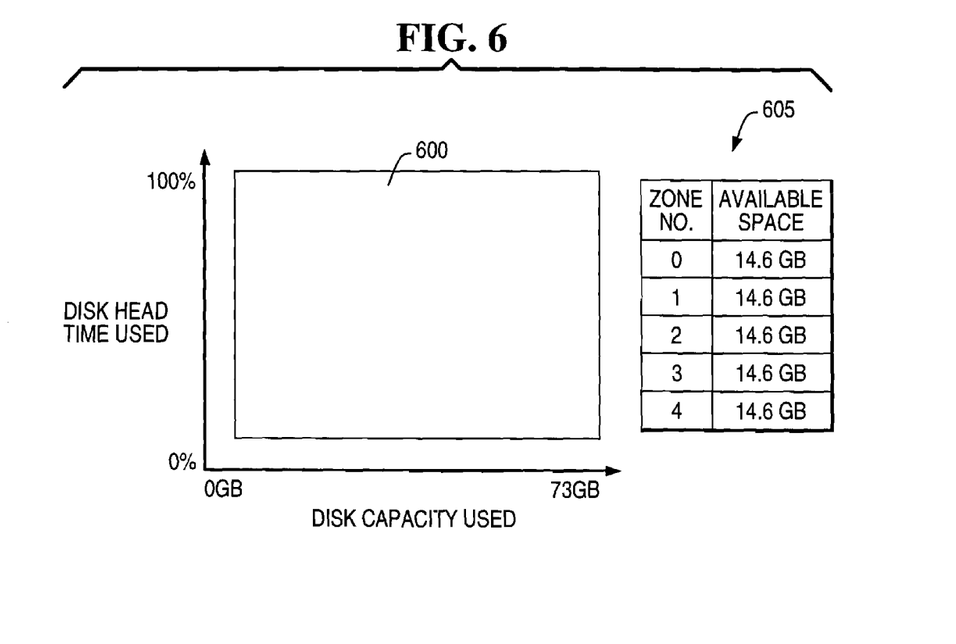
FIGS. 6-9 illustrate the technique of allocation of resources within a computer system that includes multiple zones on one or more of the disks.

Referring to FIG. 6, box 600 illustrates the unallocated resources made available by the disk drive. These resources are the physical storage space or disk capacity used and disk head time as a percentage of time disk head used. The total capacity of the disk shown in FIG. 6 is 73 GB. The disk has 5 zones, each zone having available space of 14.6 GB each. The size of each zone and how much space remains in each zone is stored in a table the contents of which are indicated at 605. There are 5 zones numbered from 0-4 each having an initial available space of 14.6 GB. It is assumed that the average read seek time is 2 ms and that the average write seek time is 3 ms. The specific transfer rates for each zone are set out in the following table:

| Zone | Sustained Read Transfer Rate (Mbytes/sec) | Sustained Write Transfer Rate (Mbytes/sec) | Single-Track Transfer Rate (Mbytes/sec) |
|---|---|---|---|
| 0 | 800 | 700 | 1200 |
| 1 | 750 | 650 | 1125 |
| 2 | 700 | 600 | 1050 |
| 3 | 650 | 550 | 975 |
| 4 | 600 | 500 | 900 |

The unallocated resources are initially perfectly balanced. Using equation (1) above, the initial balance is:

$$\text{balance} = \frac{16 \times 1 \times 1}{(2 \times 1 + 2 \times 1)^2} = 1$$

Figure 7:
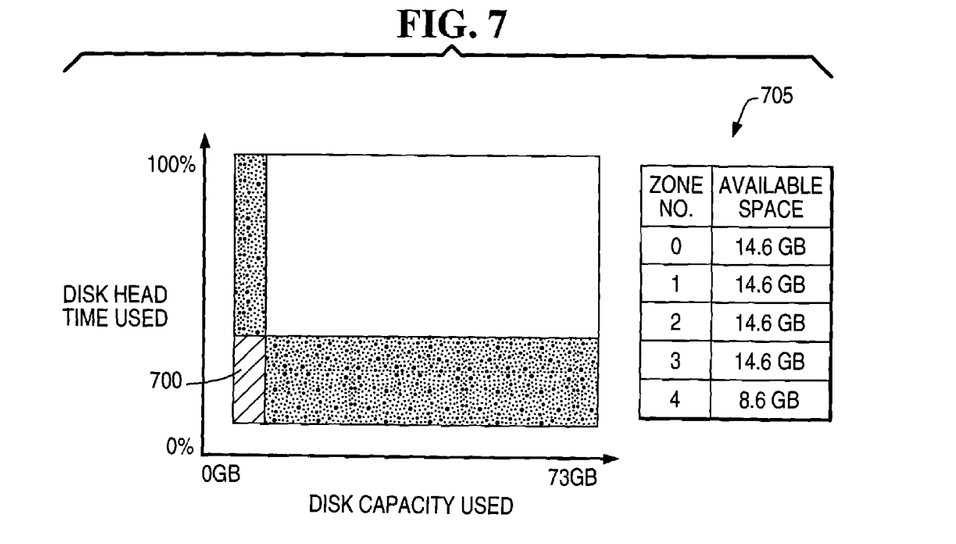

Referring to FIG. 7, an allocation 700 is made to zone 4 of the disk drive. The allocation 700 is represented in FIG. 7 by a rectangle with width and height in proportion to the amount of each resource allocated. Allocation 700 uses 6 GB from zone 4 resulting in a decrease in the available space for zone 4 to 8.6 GB as shown at 705.

At an I/O frequency of 200 times a second the requesting application performs a 4 KB read sequentially. The average read seek time is 2 ms. The single track transfer rate from the table above for zone 4 is 900 MB/s. The disk maximum busy time for simplification is 100%. The total time used is calculated from equation (10) above as:

$$\text{disk time} = \frac{200\left(2 + \frac{0.004}{900}1000\right)}{1} \approx 401 \text{ ms}$$

The percentage disk head time used is calculated as:

$$\text{disk time percentage} = \frac{401}{1000} = 0.401 = 40.1\%$$

The percentage of storage space used is:

$$\text{storage space} = \frac{6 \text{ GB}}{73 \text{ GB}} \approx 0.082 = 8.2\%$$

The resulting balance is calculated using equation (1) above as:

$$\text{balance} = \frac{16 \times 0.918 \times 0.599}{(2 \times 0.918 + 2 \times 0.599)^2} \approx \frac{8.798}{9.205} \approx 0.956$$

Figure 8:
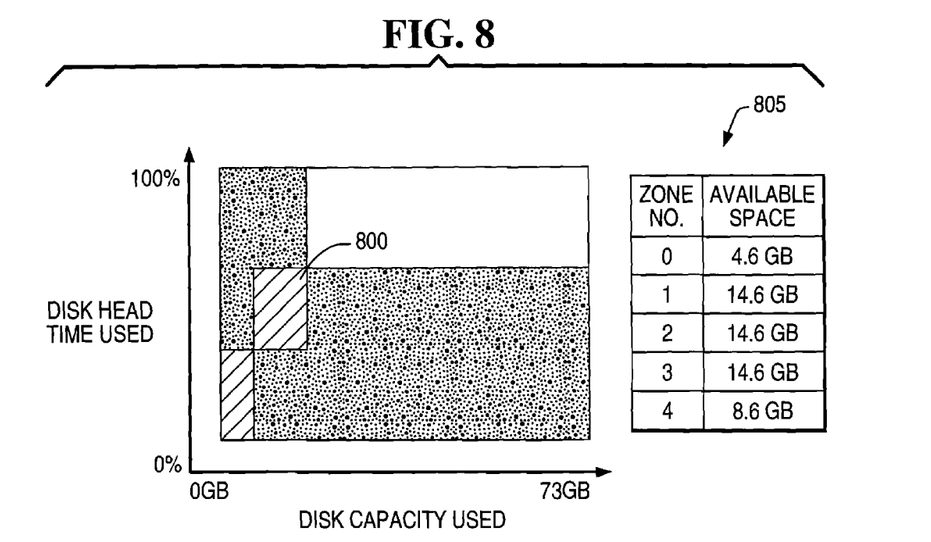

Referring to FIG. 8, a second allocation 800 is then made to zone 0 of the disk drive. The allocation 800 is represented in FIG. 8 by a rectangle with width and height in proportion to the amount of each resource allocated. Allocation 800 uses 10 GB from zone 0 resulting in a decrease in the available space for zone 0 to 4.6 GB as shown at 805.

At an I/O frequency of once each second the requesting application performs a 100 MB read sequentially. The average read seek time is 2 ms. The sustained read transfer rate for zone 0 is 800 MB/s. The disk maximum busy time for simplification is 100%. The total time used is calculated from equation (10) above as:

$$\text{disk time} = \frac{1\left(2 + \frac{100}{800}1000\right)}{1} = 127 \text{ ms}$$

At an I/O frequency of once each second the requesting application performs a 100 MB write sequentially. The average write seek time is 3 ms. The sustained write transfer rate for zone 0 is 700 MB/s. The disk maximum busy time for simplification is 100%. The total time used for the second allocation is calculated from equation (10) above as:

$$\text{disk time} = \frac{1\left(3 + \frac{100}{700}1000\right)}{1} \approx 146 \text{ ms}$$

The percentage disk head time used for the second allocation is calculated as:

$$\text{disk time percentage} = \frac{127 + 146}{1000} = 0.273 = 27.3\%$$

The total percentage of disk time used for the first and second allocations is:

total disk time=40.1+27.3=67.4%

The total percentage of storage space used for the first and second allocations is:

$$\text{total storage space} = \frac{6 + 10}{73} \approx 0.219 = 21.9\%$$

The resulting balance is calculated using equation (1) above as:

$$\text{balance} = \frac{16 \times 0.781 \times 0.326}{(2 \times 0.781 + 2 \times 0.326)^2} \approx \frac{4.074}{4.902} \approx 0.831$$

Figure 9:
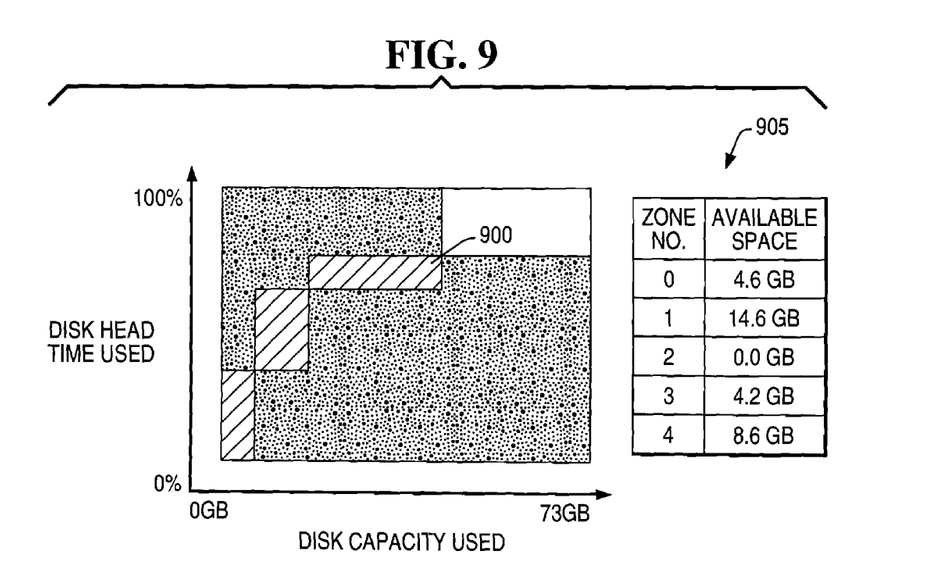

Referring to FIG. 9, a third allocation 900 is then made from zones 2 and 3 of the disk drive. The allocation 900 is represented in FIG. 9 by a rectangle with width and height in proportion to the amount of each resource allocated. Allocation 900 uses 25 GB from zones 2 and 3 resulting in a decrease in the available space for zones 2 and 3 to 0.0 GB and 4.2 GB respectively shown at 905.

At an I/O frequency of 5 times each second the requesting application performs a 10 MB read sequentially from zone 2 or 3. The average read seek time is 2 ms. The amount allocated from zones 2 and 3 is 25 Gb, which comprises 14.6 Gb for zone 2 and 10.4 Gb for zone 3.

The sustained read transfer rate for zone 2 is 700 MB/s. The disk maximum busy time for simplification is 100%. The total time used is calculated from equation (10) above as:

$$\text{disk time} = \frac{5\frac{14.6}{25}\left(2 + \frac{10}{700}1000\right)}{1} \approx 47.6 \text{ ms}$$

The sustained read transfer rate for zone 3 is 650 MB/s. The disk maximum busy time for simplification is 100%. The total time used for the third allocation is calculated from equation (10) above as:

$$\text{disk time} = \frac{5\frac{10.4}{25}\left(2 + \frac{10}{650}1000\right)}{1} \approx 36.2 \text{ ms}$$

The percentage disk head time used for the third allocation is calculated as:

$$\text{disk time percentage} = \frac{47.6 + 36.2}{1000} = 0.0838 \approx 8.4\%$$

The total percentage of disk time used for all three allocations is:

total disk time=40.1+27.3+8.4=75.8%

The percentage of storage space used is:

$$\text{storage space} = \frac{6 + 10 + 25}{73} \approx 0.561 = 56.1\%$$

The resulting balance is calculated using equation (1) above as:

$$\text{balance} = \frac{16 \times 0.439 \times 0.242}{(2 \times 0.439 + 2 \times 0.242)^2} \approx \frac{1.700}{1.855} \approx 0.916$$

The techniques described above offer advantages over previous methods of allocating disk space. Such previous methods include filling each cylinder allocation request from the emptiest disk without paying any regard to percentage disk head utilization. The drawback of previous methods is that one disk could be heavily utilized and another disk not used at all. Encouraging equal utilization of disks causes performance gains as no disks are overloaded.

Figure 10:
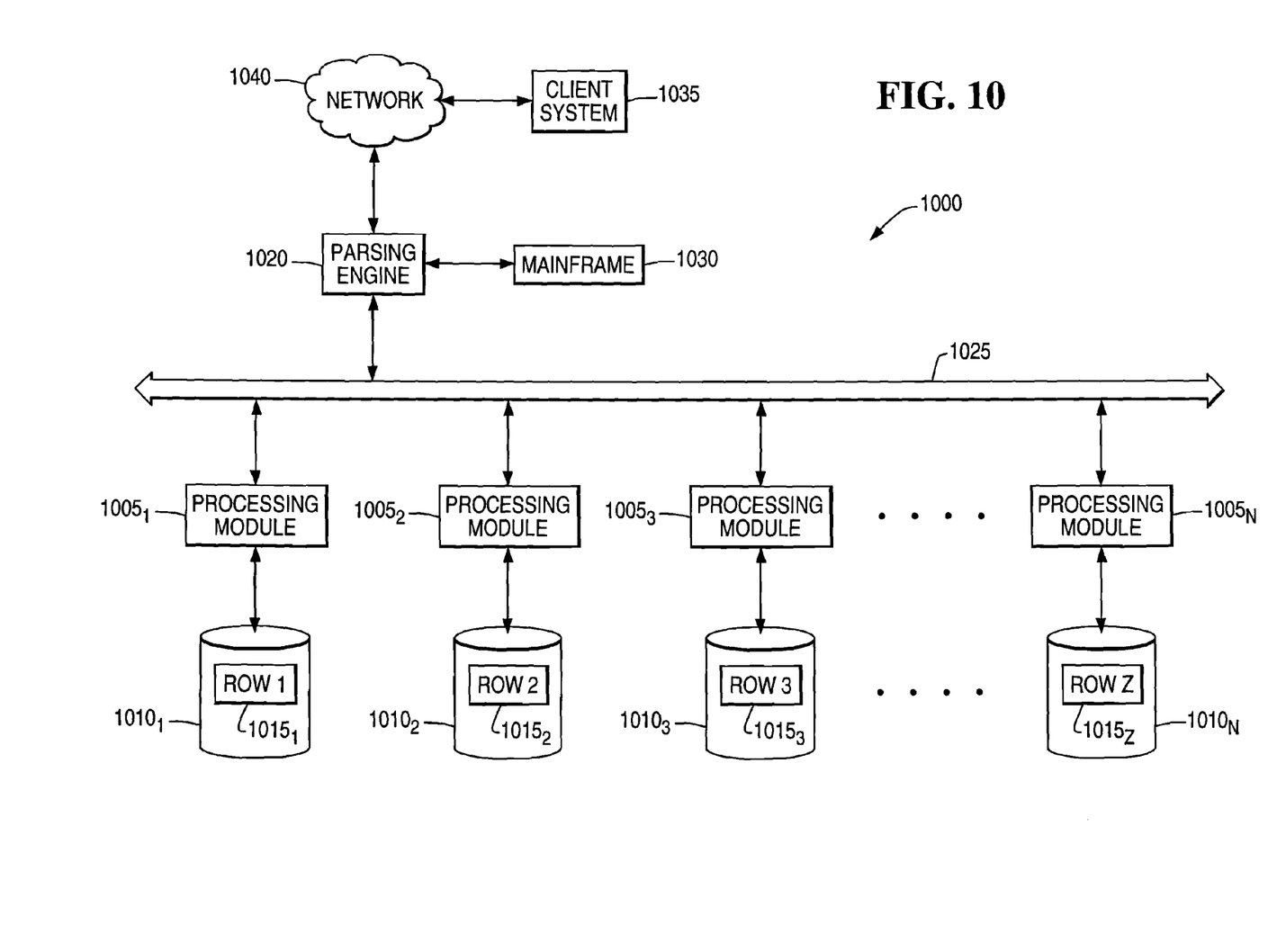
FIG. 10 is a block diagram of an exemplary large computer system in which the techniques described below are alternatively implemented.

FIG. 10 shows an example of a database system 1000, such as a Teradata Active Data Warehousing System available from NCR Corporation, in which the above techniques are alternatively implemented. In computer system 1000, vast amounts of data are stored on many disk-storage facilities that are managed by many processing units. In this example, the data warehouse 1000 includes a relational database management system (RDMS) built upon a massively parallel processing (MPP) platform.

Other types of database systems, such as object-relational database management systems (ORDMS) or those built on symmetric multi-processing (SMP) platforms, are also suited for use here.

The data warehouse 1000 includes one or more processing modules $\mathbf{1005}_{1...N}$ that manage the storage and retrieval of data in data storage facilities $\mathbf{1010}_{1...N}$. Each of the processing modules $\mathbf{1005}_{1...N}$ manages a portion of a database that is stored in a corresponding one of the data storage facilities $\mathbf{1010}_{1...N}$. Each of the data storage facilities $\mathbf{1010}_{1...N}$ includes one or more disk drives.

The system stores data in one or more tables in the data storage facilities $\mathbf{1010}_{1...N}$. The rows $\mathbf{1015}_{1...Z}$ of the tables are stored across multiple data storage facilities $\mathbf{1010}_{1...N}$ to ensure that the system workload is distributed evenly across the processing modules $\mathbf{1005}_{1...N}$. A parsing engine 1020 organizes the storage of data and the distribution of table rows $\mathbf{1015}_{1...Z}$ among the processing modules $\mathbf{1005}_{1...N}$. The parsing engine 1020 also coordinates the retrieval of data from the data storage facilities $\mathbf{1010}_{1...N}$ over network 125 in response to queries received from a user at a mainframe 1030 or a client computer 1035 connected to a network 1040. The database system 1000 usually receives queries and commands to build tables in a standard format, such as SQL.

In one implementation, the rows $\mathbf{1015}_{1...Z}$ are distributed across the data-storage facilities $\mathbf{1010}_{1...N}$ by the parsing engine 1020 in accordance with their primary index. The primary index defines the columns of the rows that are used for calculating a hash value. The function that produces the hash value from the values in the columns specified by a primary index is called a hash function. Some portion, possibly the entirety, of the hash value is designated a "hash bucket". The hash buckets are mapped to data-storage facilities $\mathbf{1010}_{1...N}$ and associated processing modules $\mathbf{1005}_{1...N}$ by a hash bucket map (not shown). The characteristics of the columns chosen for the primary index determine how evenly the rows are distributed.

The techniques described above enable various components of system 1000 to take balance into account when allocating resources within the system.

The solution offers the advantage of balanced allocation of resources. The techniques described above avoid the situation where one resource is completely used, making the other resources unavailable for a particular resource provider.

The text above describes one or more specific embodiments of a broader invention. The invention also is carried out in a variety of alternative embodiments and thus is not limited to those described here. Those other embodiments are also within the scope of the following claims.

We claim:

1. A method of calculating the optimal allocation of two or more resources provided by a resource provider to a task within a computer system from a plurality of possible allocations, the method comprising:

calculating the total volume of an N-dimensional cube, where N is the number of resources provided by the resource provider, representing the respective amounts of resources available to be allocated;

calculating the average volume of the N−1 dimensional shapes forming the sides of the N-dimensional cube;

calculating, at least partly from the ratio of the total volume to the average volume, the balance resulting from the allocation of resources represented by the N-dimensional cube;

calculating the imbalance resulting from the allocation of resources at least partly from the balance; and determining the smallest imbalance as the optimal allocation of resources.

2. The method of claim 1 wherein the computer system includes one or more storage facilities managed by one or more processing units, wherein the resource provider comprises one of the storage facilities.

3. The method of claim 2 wherein one of the resources provided by the resource provider comprises physical storage space.

4. The method of claim 2 wherein one of the resources provided by the resource provider comprises disk head time.

5. The method of claim 2 further comprising the step of defining a plurality of logical zones for one or more of the storage facilities, each zone providing physical storage space and disk head time.

6. The method of claim 5 further comprising the step of maintaining a table representing the amount of physical storage space remaining in each zone.

7. The method of claim 5 further comprising the step of defining a plurality of classes of I/O operations, each class having a zone number, frequency, data block size and a read/write indicator.

8. The method of claim 7 further comprising the step of calculating disk head time for a storage facility by calculating the disk head time for each class and calculating the total disk head time at least partly from the sum of disk head times for each class.

9. The method of claim 1 wherein the computer system includes one or more storage facilities managed by one or more processing units, wherein the service provider comprises the combination of one of the storage facilities and the processing unit managing that storage facility.

10. A method of calculating the optimal allocation, from a plurality of possible allocations, of disk head time and physical storage space provided by a resource provider to a task within a computer system, the method comprising:

calculating the area of a plane figure representing the respective amounts of disk head time and physical storage space available to be allocated;

calculating the perimeter of the plane figure;

calculating, at least partly from the ratio of the area of the plane figure to the perimeter of the plane figure, the balance resulting from the allocation of resources represented by the plane figure; and determining the largest balance as the optimal allocation of resources.

11. The method of claim 10 wherein the computer system includes one or more storage facilities managed by one or more processing units, wherein the resource provider comprises one of the storage facilities.

12. The method of claim 10 wherein the computer system includes one or more storage facilities managed by one or more processing units, wherein the resource provider comprises the combination of one of the storage facilities and the processing unit managing that storage facility.

13. A system for calculating the optimal allocation of two or more resources provided by a resource provider to a task within a computer system from a plurality of possible allocations, where the system is configured to:

calculate the total volume of an N-dimensional cube, where N is the number of resources provided by the resource provider, representing the respective amounts of resources available to be allocated;

calculate the average volume of the N−1 dimensional shapes forming the sides of the N-dimensional cube;

calculate, at least partly from the ratio of the total volume to the average volume, the balance resulting from the allocation of resources represented by the N-dimensional cube;

calculate the imbalance resulting from the allocation of resources at least partly from the balance; and determine the smallest imbalance as the optimal allocation of resources.

14. A system for calculating the optimal allocation, from a plurality of possible allocations, of disk head time and physical storage space provided by a resource provider to a task within a computer system, where the system is configured to:

calculate the area of a plane figure representing the respective amounts of disk head time and physical storage space available to be allocated;

calculate the perimeter of the plane figure;

calculate, at least partly from the ratio of the area of the plane figure to the perimeter of the plane figure, the balance resulting from the allocation of resources represented by the plane figure; and determine the largest balance as the optimal allocation of resources.

15. A computer program stored on tangible storage media comprising executable instructions for performing a method of calculating the optimal allocation of two or more resources provided by a resource provider to a task within a computer system from a plurality of possible allocations, the method comprising:

calculating the total volume of an N-dimensional cube, where N is the number of resources provided by the resource provider, representing the respective amounts of resources available to be allocated;

calculating the average volume of the N−1 dimensional shapes forming the sides of the N-dimensional cube;

calculating, at least partly from the ratio of the total volume to the average volume, the balance resulting from the allocation of resources represented by the N-dimensional cube;

calculating the imbalance resulting from the allocation of resources at least partly from the balance; and determining the smallest imbalance as the optimal allocation of resources.

16. A computer program stored on tangible storage media comprising executable instructions for performing a method of calculating the optimal allocation, from a plurality of possible allocations, of disk head time and physical storage space provided by a resource provider to a task within a computer system, the method comprising:

calculating the area of a plane figure representing the respective amounts of disk head time and physical storage space available to be allocated;

calculating the perimeter of the plane figure;

calculating, at least partly from the ratio of the area of the plane figure to the perimeter of the plane figure, the balance resulting from the allocation of resources represented by the plane figure; and determining the largest balance as the optimal allocation of resources.

* * * * *